May 25, 1926.
J. J. MASCUCH
AUTOMOBILE BUMPER
Filed Feb. 8, 1926
1,585,782
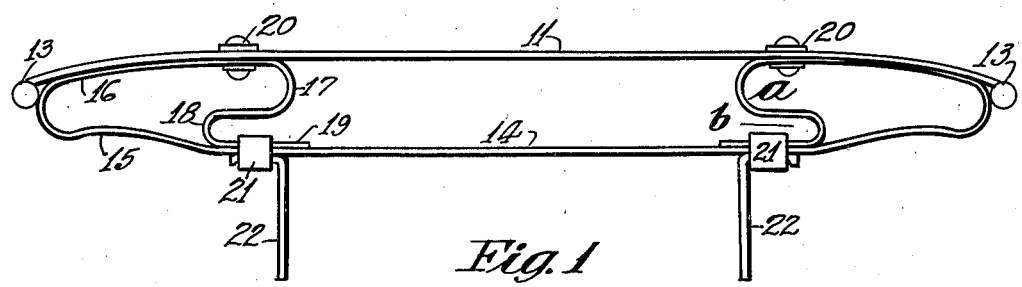
*Fig. 1*
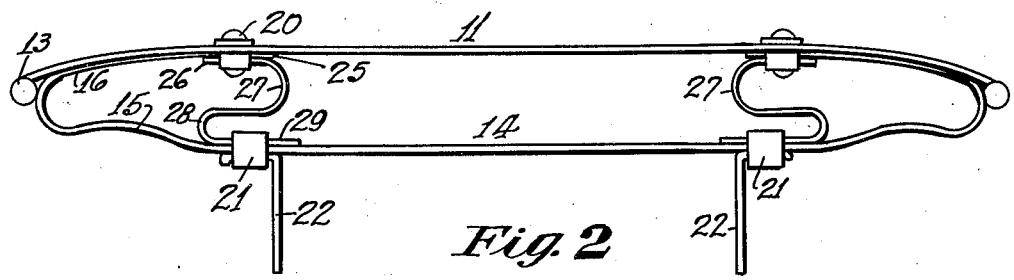
*Fig. 2*
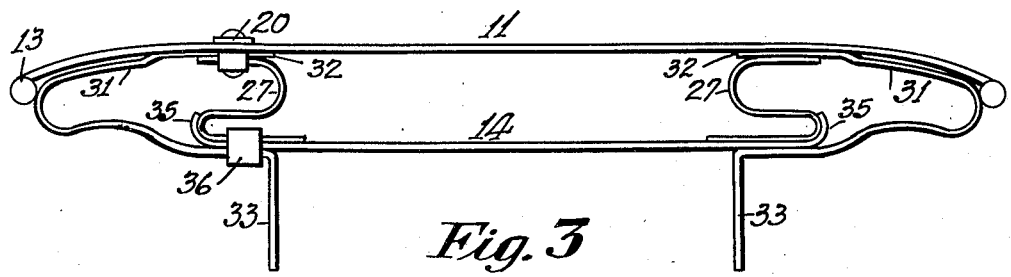
*Fig. 3*
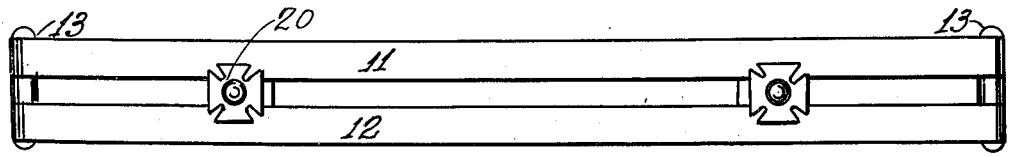
*Fig. 4*
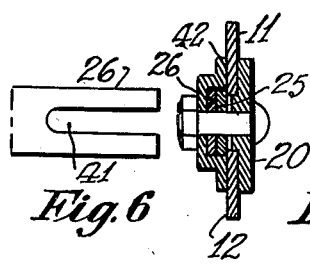
*Fig. 6*   *Fig. 5*
INVENTOR.
Joseph J. Mascuch
BY
M. K. Laughridge
ATTORNEY.

Patented May 25, 1926.

1,585,782

UNITED STATES PATENT OFFICE.

JOSEPH J. MASCUCH, OF EAST ORANGE, NEW JERSEY.

AUTOMOBILE BUMPER.

Application filed February 8, 1926. Serial No. 86,905.

This invention relates to automobile bumpers particularly of the spring bar type and has for an object to provide a bumper of this type which is resilient, which is capable of resisting heavy impacts and which is not materially influenced by vibration such as is received by an automobile on the road. These and other objects of the invention will be understood from the following specification and the accompanying drawings, in which, Fig. 1, is a plan view of an automobile bumper embodying my invention, Fig. 2 is another plan view embodying my invention, Fig. 3 is also a plan view of a modification of my invention, Fig. 4 is an elevation of my invention looking towards the impact members, Fig. 5 is a sectional detail of the clamp securing the parts of the bumper together and Fig. 6 is a detail of one of the clamping elements.

This application is a modification of the invention shown in U. S. Patent 1,557,719, issued in my name on October 20, 1925, and is adapted for bumpers of light bar stock. It has been found that bumpers constructed according to the patent of light stock are subject to considerable vibration which is liable to introduce fatigue in the metal and thus induce brittleness. In the present invention the vibration of the bars of the bumper is prevented or dampened by the introduction of an S spring between the back and front members of the bumper. This S spring may be formed integrally with the rear supporting member or may be a separate piece and is adjustably clamped to the bumper members. This spring is so formed that its tension is varied upon compression.

Referring to the drawings, 11 and 12 are the impact members which are held in vertical relation by the end posts 13. The bumper is preferably, provided with a rear bar 14 curved forwardly at 15 and reversely curved at 16 to align with the impact bars 11 and 12 and to which it is clamped at 20. In Fig. 1, the end of bar 16 which is a continuation of the back bar 14 is formed into an S spring at 17 and 18 with the end 19 parallel with the back bar 14 and to which it is adjustably secured together with the supporting bracket 22 by the clamp 21. It will be noted that the bumper is symmetrical about the centre line, each side having corresponding parts similarly referenced.

In this construction it will be observed that the S spring is formed of unequal loops, the loop $a$ being about twice the radius of loop $b$ and the part connecting these loops and tangent thereto is parallel with the back bar 14 and opposite this part the clamp 21 is located. This S spring provides a support for the impact bars intermediate their ends and connecting with the rear bar and supporting bracket forming a reinforced truss construction which dampens the vibrations in the suspended impact bars as a car proceeds along the roadway.

When the impact bar receives a thrust the loops $a$ and $b$ of the S spring are compressed until the loop $b$ is closed by the connecting part engaging the clamp 21 or the end 19, then the thrust is resisted by the loop $a$ and the resistance of the bumper is correspondingly increased. The resiliency of the bumper is thus decreased as it is compressed.

In Fig. 2 the S spring is made of a separate part from the rear bar which terminates at 25. This spring comprises the loops 27 and 28 with the end 26 clamped at 20 to the impact bars 11 and 12, and the end 29 clamped at 21 to the rear bar 14 and the bracket 22.

In Fig. 3 the S spring and the rear bar are separate units while the end loop of the bumper and the supporting bracket are integral parts. In the right hand portion of the drawing the clamps are omitted to show the arrangement of the parts. The S spring is similar to the spring in Fig. 2; the rear bar 14 terminates in the curved end 35 which abuts on the small loop of the S spring and is thereby held in place. The end loop of the bumper 31 is clamped to the impact bars at 32 by the clamp 20 and is clamped to the rear bar 14 and the S spring by the clamp 36 while the end 33 is turned back at right angles to form the supporting bracket which is secured to the automobile frame. In this construction the parts are easily shaped by a simple bending operation.

Fig. 4 shows the elevation of the front of the bumper using double impact bars placed in vertical relation. As the present invention resides in the rear construction of the bumper it is apparent that it may be used with single or double impact bars.

The clamp between the impact bars and the rear members of the bumper is shown in section in Fig. 5. The ends 25 and 26 are enclosed by the clamp plate 42 which clamps the bars 11 and 12 against 20. The ends of the bars 25 and 26 may be slotted as at 41, Fig. 6 so that the position of clamp 20 on the impact bars may be adjustable.

Having thus described my invention, I claim:

1. In a bumper as described, the combination of an impact member and a rear supporting bar with an S spring connecting said rear bar with said impact member, said S spring being formed of a pair of unequal loops.

2. In a bumper as described, the combination of an impact member and a rear supporting bar with an S spring connecting said rear bar with said impact member, said S spring adjustably clamped to said impact member and said rear bar.

3. In a bumper as described, the combination of an impact member and a rear supporting bar, said rear supporting bar including an S spring formed of a pair of unequal loops and clamped to said impact bar and to said rear bar.

4. In a bumper as described, the combination of an impact member and a rear supporting bar with an S spring formed of a pair of unequal loops connecting said impact bar with said rear bar, the smaller of said loops being adjacent said rear bar and the part connecting said loops being parallel with said rear bar.

Signed at Wilkes-Barre in the county of Luzerne and State of Penna. this 29th day of December A. D. 1925.

JOSEPH J. MASCUCH.